(12) United States Patent
Tseng et al.

(10) Patent No.: US 7,006,352 B2
(45) Date of Patent: Feb. 28, 2006

(54) INTERFACE PANEL STRUCTURE

(75) Inventors: Yung Chuan Tseng, Miao-Li (TW); Kuan Chou Ko, Miao-Li (TW); Yi Cheng Yuan, Miao-Li (TW); Chen Yu Chang, Miao-Li (TW)

(73) Assignee: Coretronic Corporation, (TW)

( * ) Notice: Subject to any disclaimer, the term of this patent is extended or adjusted under 35 U.S.C. 154(b) by 0 days.

(21) Appl. No.: 10/952,770

(22) Filed: Sep. 30, 2004

(65) Prior Publication Data

US 2005/0247707 A1 Nov. 10, 2005

(30) Foreign Application Priority Data

May 7, 2004 (TW) ................................ 93112919 A

(51) Int. Cl.
*G06F 1/16* (2006.01)
(52) U.S. Cl. .................... 361/686; 361/735; 439/540.1; 700/214
(58) Field of Classification Search ........ 361/679–687, 361/724–727, 730–375; 700/214, 242, 236; 439/638, 639, 470, 540, 540.1
See application file for complete search history.

(56) References Cited

U.S. PATENT DOCUMENTS

| 5,159,534 A | * | 10/1992 | Hudson et al. | ............. 361/683 |
| 6,302,742 B1 | * | 10/2001 | Berst et al. | ................. 439/638 |
| 6,761,583 B1 | * | 7/2004 | Ortowski et al. | ........ 439/540.1 |
| 2003/0092314 A1 | * | 5/2003 | Whiteside et al. | ........ 439/540.1 |

* cited by examiner

*Primary Examiner*—Hung Van Duong
(74) *Attorney, Agent, or Firm*—Birch, Stewart, Kolasch & Birch, LLP

(57) ABSTRACT

An interface panel structure used in an electric machine; comprises a fixed seat with a fixed seat with a holding element and sliding rails and a movable sliding seat installed therein. Fixing holes for accepting the holding element and sliding grooves operated in cooperation with the sliding rails are disposed in the sliding seat. In addition, a guide rod is installed in the sliding seat for touching off the holding the holding element to separate it from the fixing hole. When the holding element and the fixing hole are engaged, the sliding seat with interface outlets disposed at the front face thereof is hidden in the fixed seat fixed in the electric machine. And, there is no need to open holes on the surface of the electric machine by means of the interface panel structure.

6 Claims, 6 Drawing Sheets

INTERFACE PANEL STRUCTURE

This Nonprovisional application claims priority under 35 U.S.C. § 119(a) on Patent Application No(s). 093112919 filed in Taiwan, Republic of China on May 7, 2004, the entire contents of which are hereby incorporated by reference.

BACKGROUND OF THE INVENTION

1. Field of the Invention

The present invention relates to an interface panel structure, and more particularly to an interface panel structure capable of being concealed or exposed in an electric machine.

2. Description of Related Art

Please refer to FIG. 1. Interface outlets 2 are installed in a frame body of a conventional electric machine 1 and an opening 4 is opened at the corresponding position of the outlets 2 on a front frame 3 so as to allow the interface outlets 2 to be exposed for a user to plug in or pull out cables. However, the exposition of the front faces of the interface outlets 2 is easy to spoil the entirety outlook of the machine and the problem of assembly clearance is still existed at the front faces of the interface outlet 2 even if a decoration cover (not shown in the figure) is installed. Besides, a mold needs to remade so as to change the opening opened in the front frame when the numbers of the interface outlets 2 needs to be changed depending on a user's different requirement if the structure mentioned above is adopted. And, the interface outlets 2 installed in the frame body are also replaced through a complicate detachment procedure so as to cause the variability of the interface outlets to be limited. If a maintenance or replacement is needed, the detachment wastes time and labor. Therefore, developing an interface panel structure that is easy to be maintained and replaced and does not spoil the entirety outlook thereof is really necessary.

SUMMARY OF THE INVENTION

One object of the present invention is to provide an interface panel structure, using a movable type design matching a fixed seat with a sliding seat to replace the conventional fixing type design disposing an opening in a front frame to enhance convenience for maintaining or replacing an interface panel.

Another object of the present invention is to provide an interface panel structure, utilizing installments of a fixed seat and movable sliding seat in a housing to allow an interface panel to be hidden in the housing while not being used and to be exposed when it is in use so as to keep the outlook of a front frame of an electric machine compact and integrated.

Still another object of the present invention is to provide an interface panel structure, allowing the interface panel structure to be used in every kind of electric machine to enhance its use flexibility by integrating the interface panel structure into a module structure.

For attaining to the objects mentioned above, an interface panel structure according to the present invention is used in an electric machine; it comprises a fixed seat disposed with a holding element and a plurality of sliding rails and a movable sliding seat installed therein. A plurality of fixing holes for accepting the holding element and sliding grooves operated in cooperation with the sliding rails are disposed in the two flank sides of the sliding seat. In addition, a guide rod is installed in the sliding seat for touching off the holding element and then separating it from the fixing hole. When the holding element and the fixing hole are engaged, the sliding seat with interface outlets disposed at the front face thereof is hidden in the fixed seat in the electric machine. And, when the interface outlets need to be used, only the guide rod is operated to touch off the holding element to separate it from the fixing hole so that the sliding seat is allowed to slide down to cause the outlets to be exposed for a user to plug in or pull out cables or wires and to process maintenance conveniently. Besides, there is no need to open holes on the surface of the electric machine by means of the interface panel structure according to the present invention so that the outlook of the electric machine can be prevent from being spoiled.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
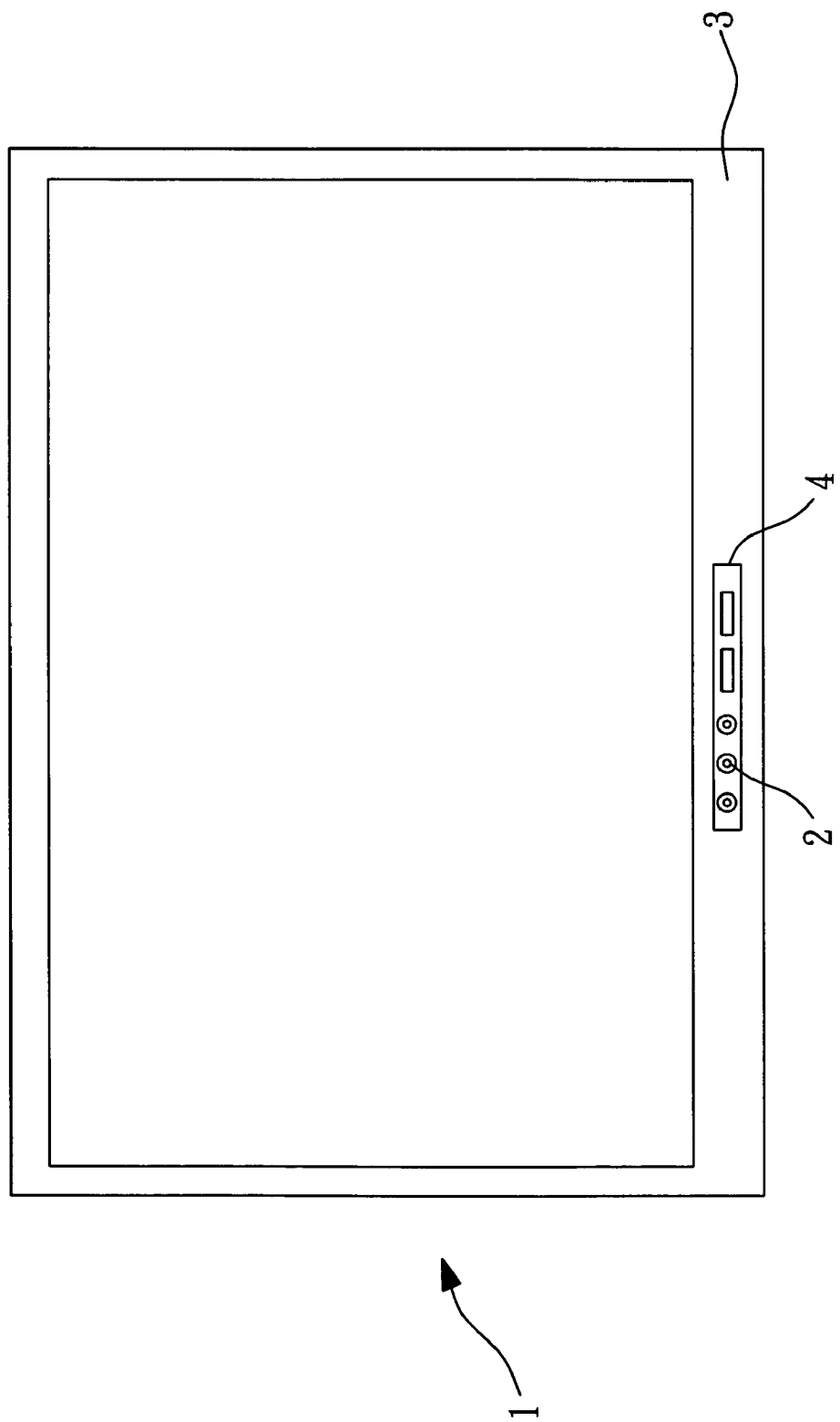
FIG. 1 is a schematic view, showing a conventional electric machine with interface outlets.
Figure 2:
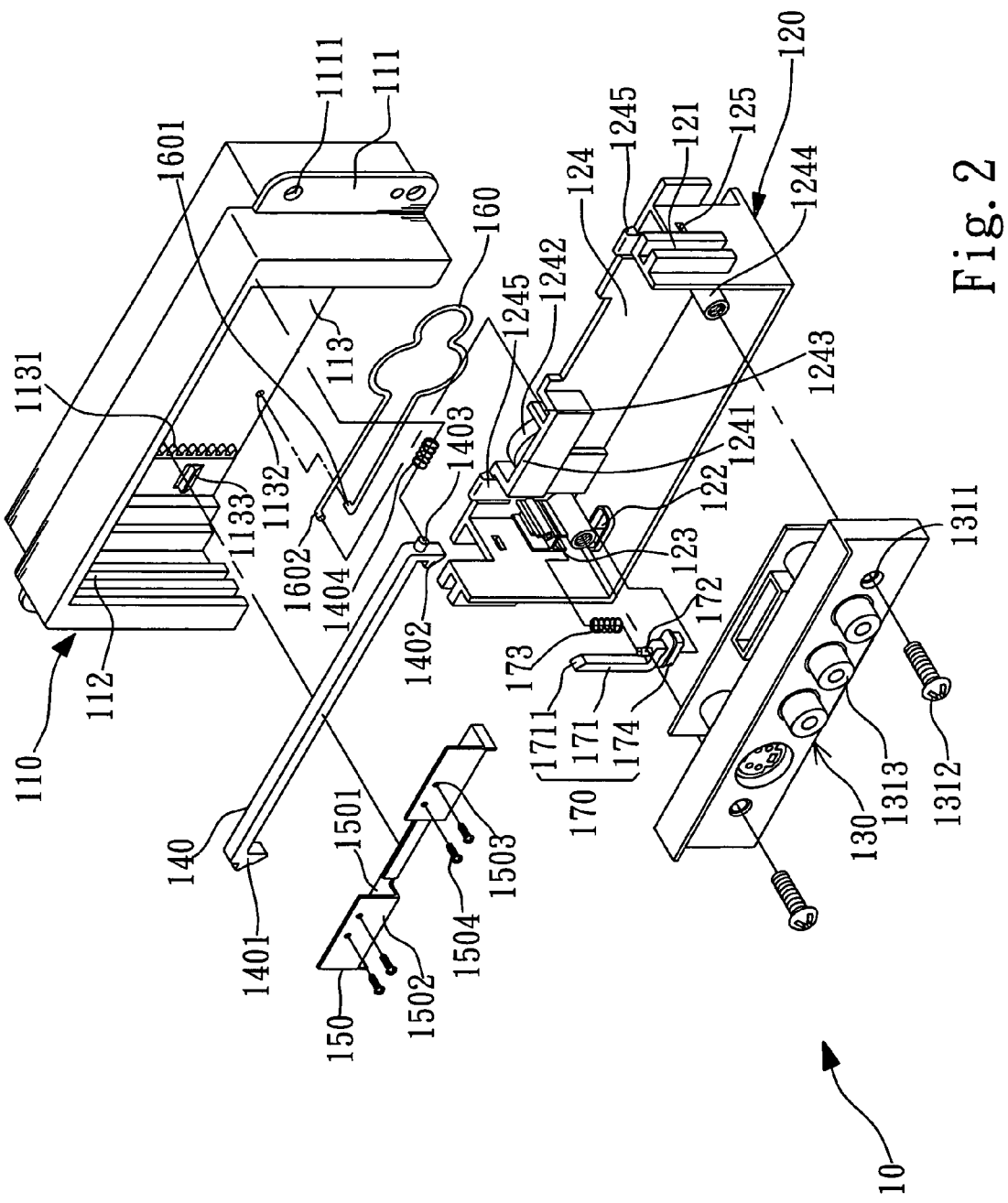
FIG. 2 is an explosive view, showing an interface panel structure according to the present invention.
Figure 3:
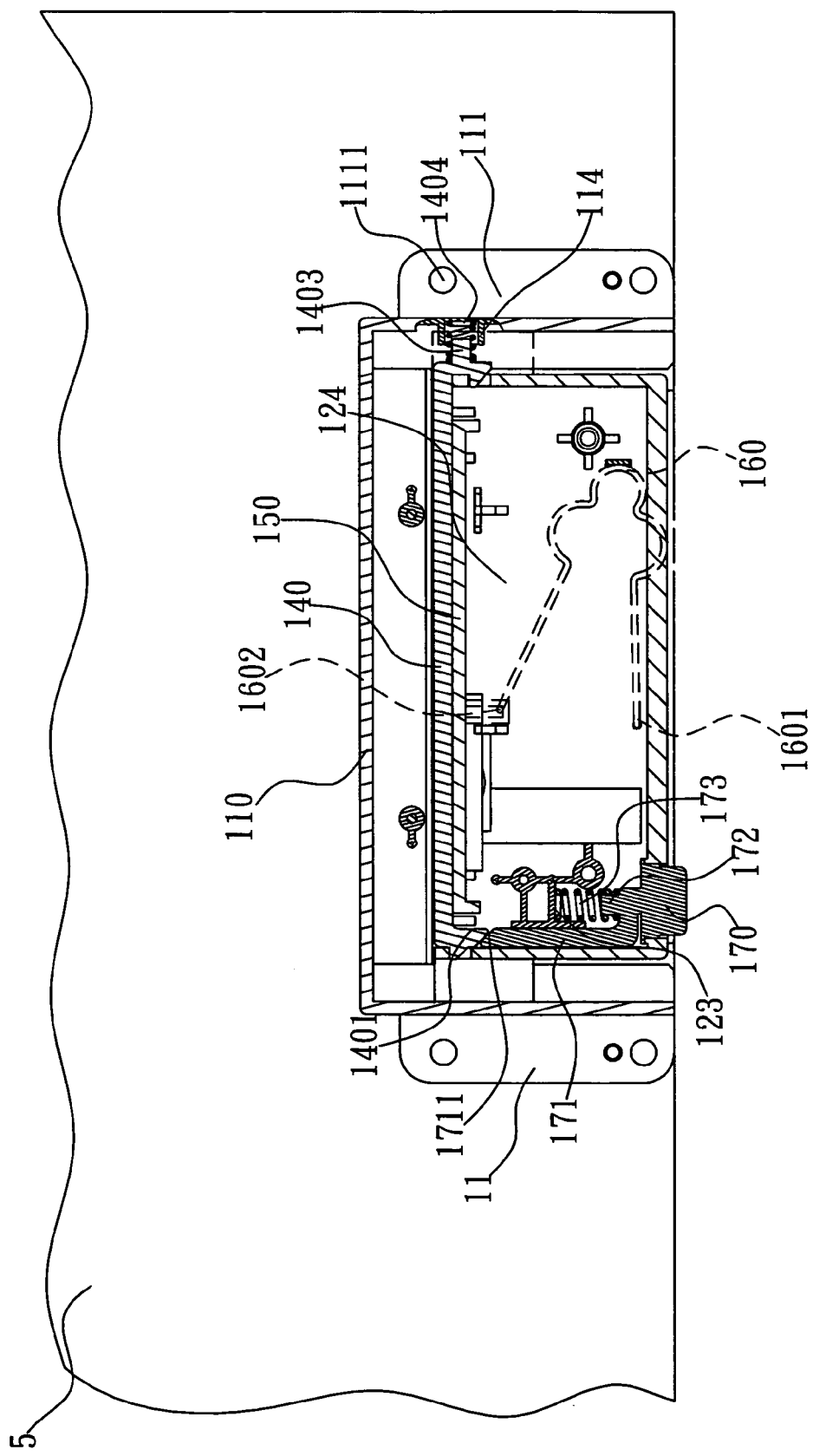
FIG. 3 is a side view, showing an interface panel structure according to the present invention.

Please refer to FIGS. 2 and 3. An interface panel structure 10 mainly comprises a fixed seat 110, sliding seat 120 and interface panel 130.

The fixed seat 110 is a ⌈冂⌋shape hollow structure and a fixing sheet 111 is respectively extended out at each side thereof. A plurality of screw holes 1111 are disposed in the fixing sheet 111 for a plurality of screws (not shown in the figure) to pass through the screw holes 1111 to fix the fixed seat 111 inside of a frame body 5 of an electric machine (not shown in the figure). According to a preferred embodiment of the present invention, the fixed seat 110 is fixed behind the front frame of the frame body; but it can be also installed at one flank side of the frame body. Here, the electric machine can be a liquid crystal display, plasma television set, rear projection television set or anything else. A plurality of sliding rails 112 are disposed at the inside faces of the two flank sides of the fixed seat 110. A longitudinal rack 1131 is disposed at the inner face of a rear plate 113 and a small round hole 1132 and a plurality of stoppers 1133 are disposed at the positions close to the bottom of the rear plate 113. And, a transversally placed holding element 140 is then installed at the upper end of the rear plate 113 and a supporting bracket is used to load it so as to fix it in the fixed seat 110. The holding element 140 is a long shaft and engaging hooks 1401 and 1402 with a downward inclined slope are respectively disposed at the two ends thereof. A short pin 1403 is projected vertically from the side face of one end of the engaging hook 1402. Furthermore, a loading seat 1501 is disposed on the supporting bracket 150 and a plurality of fixing sheet 1502 are disposed at the two sides thereof to form a transversal groove for guiding the holding element 140 to move transversely. A plurality of holes 1503 are disposed in the fixing sheet; a plurality of screws are passed through the holes 1503 to fix the supporting bracket 150 at the upper side of the rear plate 113 of the fixed seat 110 after the holding element 140 is placed on the loading seat 1501. In the meantime, the short pin 1403 of the holding element 140 is engaged with a spring 1404 used for the recovery of the holding element 140 and inserted into an accepting hole 114 at one side of the fixed seat 110.

The sliding seat 120 is used to install in the fixed seat 110. A plurality of sliding grooves 121 matched up with the sliding rails are disposed at the outside surface of the two side walls thereof and a plurality of engaged holes 125 are opened in the two side walls thereof. A hole 122 is opened at one side of the bottom of the sliding seat 120 and a stopper plate 123 is disposed above the hole 122. And, a reduction gear 1242 engaged with the rack 1131 is accepted in a shelf 1241 of the rear plate 124 of the sliding seat 120 and an accepting notch 1243 is disposed on the shelf 1241 and near to the reduction gear 1242. Moreover, a plurality of locking stands 1244 are further disposed on the inside surface of the rear plate 124 and a plurality of stopper 1245 are also disposed at the places on the sliding seat 120 corresponding to the stoppers 1133 on the fixed seat 124. Besides, a linear spring 160 is installed between the rear plate 124 of the sliding seat 120 and the rear plate 113 of the fixed seat 110; one end 1601 of the linear spring 1601 is fixed in a small round hole 1132 in the fixed seat 110 and another end 1602 is propped against the accepting notch 1243 of the sliding seat 120. In addition, an actuator 170 with a "L" shape actuating rod 171 is passed through the hole 122 in the bottom of the sliding seat. A upward inclined oblique edge 1711 corresponding to the oblique edge of the engaging hook 1401 of the holding element 140 is disposed at the top of the actuating rod 171 and a button 174, which is restricted in the hole 122 through the design of shape thereof, is installed at the bottom of the sliding seat 120. A short pin 172 disposed on the inner surface of the turning point of the actuating rod 171 and a spring 173 is covered on the short pin 172 and the top end thereof is propped against the stopper plate 123 to provide the recovery force for the actuator 170.

The interface panel 130 is installed at the front end of the sliding seat 120. A plurality of interface outlets 1313 and installing holes 1311 are disposed in the front plate of the interface panel 130. A plurality of screws 1312 are used to fix the interface panel 130 onto the locking stands 1244 through the installing holes 1311 to combine it with the sliding seat 120 into one body.

Figure 4:
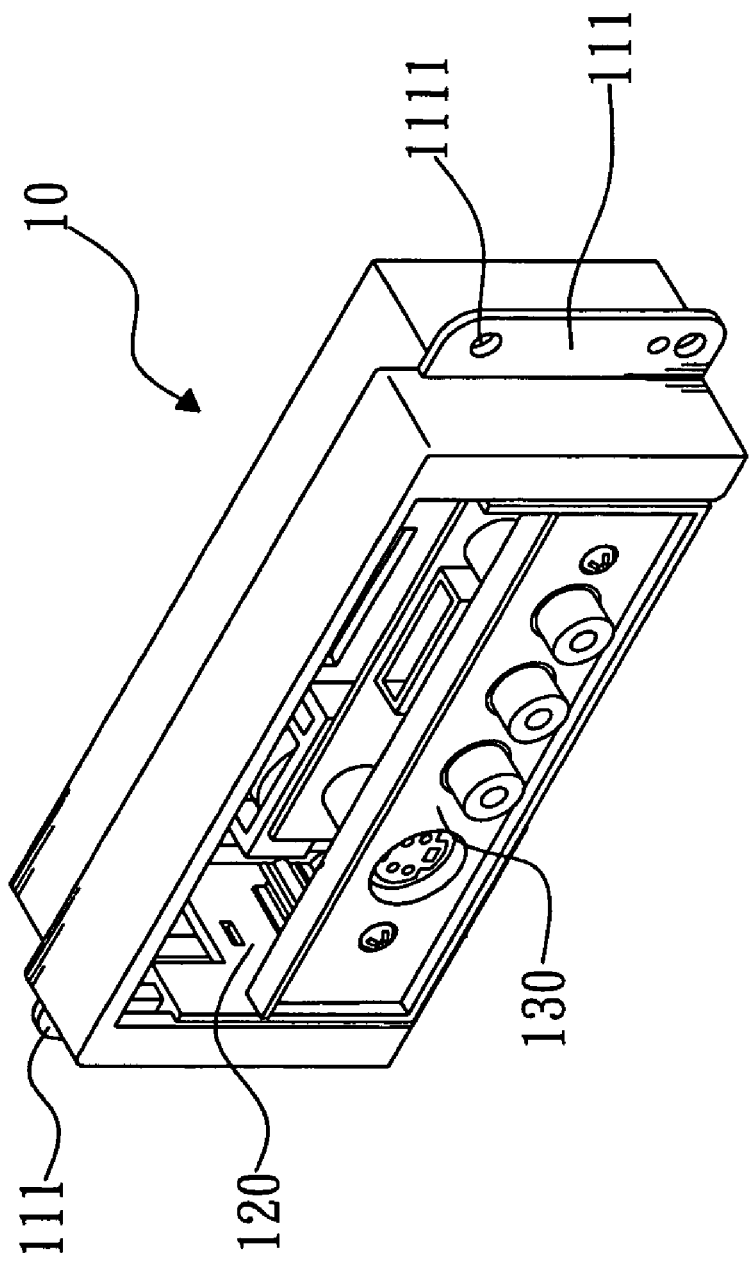
FIG. 4 is a prospective view, showing the assembly of an interface panel structure according to the present invention.

Please refer to FIG. 4. The entirety of the panel structure is hidden in the frame body 5 of the electric machine by combining the elements mentioned above to form the electric machine according to the present invention. The engaging hooks 1401 and 1402 at the two ends of the holding element 140 are stuck in the engaged holes 125 at the two sides of the sliding seat 120. And, the engaging hooks 1401 and 1402 can be stably stuck in the engaged holes 125 so as to hide the sliding seat 120 in the front frame of the electric machine owing to the sustenance of the spring 1404 installed in the accepting hole 114. Therefore, the interface panel 130 fixed on the sliding seat 120 is also hidden in the frame body 5 of the electric machine. In the meantime, the linear spring 160 is also stretched out to store elastic energy owing to the rising of the end 1602 propped against the accepting notch 1243. Moreover, the oblique edge 1711 at the top end of the actuating rod 171 on the actuator 170 is just touched the engaging hook 1401 at one end of the holding element 140.

Figure 5A:
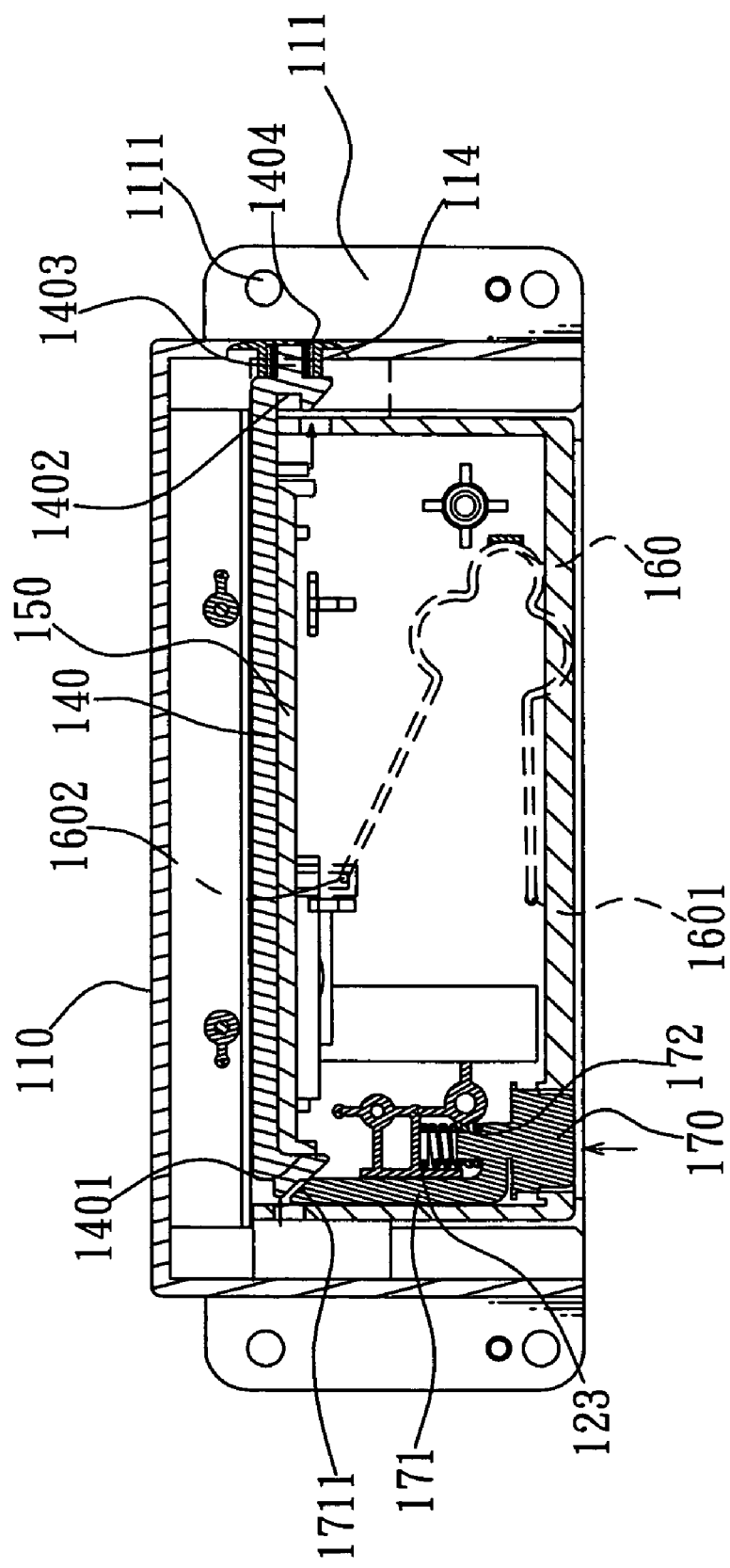
FIG. 5A is a schematic cross sectional view, showing a condition that an interface panel structure according to the present invention is actuated and about to be exposeded from a hidden state.
Figure 5B:
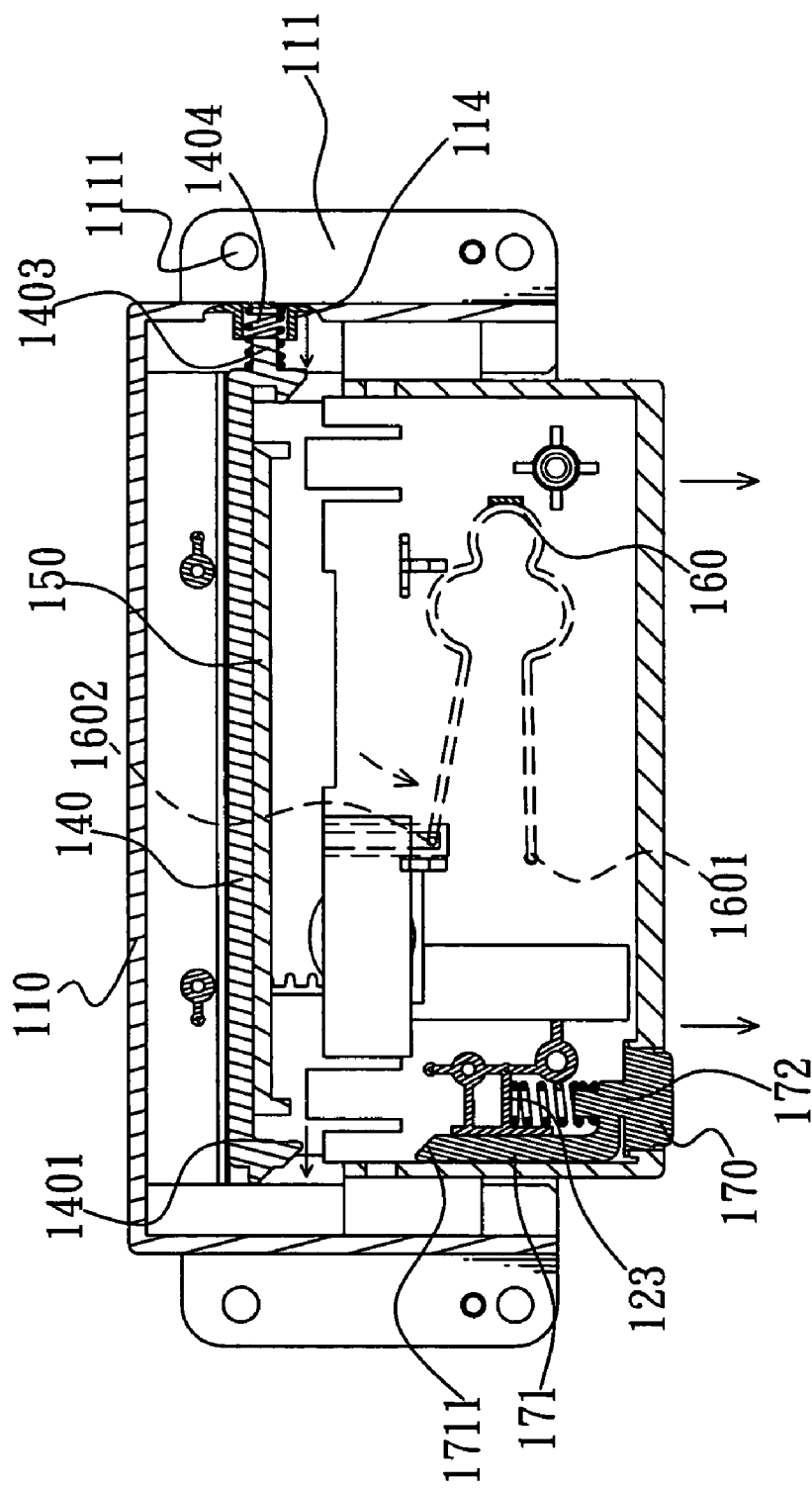
FIG. 5B is a schematic cross sectional view, showing a condition that an interface panel structure according to the present invention is exposed.

Please refer to FIGS. 5A and 5B, which are schematic views showing the motion opening a interface panel. When a user wants to use the interface panel, he only needs to press the actuator 170 upwards from the bottom of the sliding seat to allow the actuating rod 171 also to move upwards. The inclined face 1711 at the top end of the actuating rod 171 will touch the inclined face of the engaging hook 1401 at the left side of the holding element 140. The holding element 140 is move to the right owing to inclined plane movement to cause the engaging hook to be separated from the left and right engaged holes 125 and further to cause the sliding seat 120 to be separated from the holding of the holding element 140. In the meantime, the springs 1404 and 173 are compressed. Thereafter, the stretched-out linear spring 160 is shrunk owing to elastic force recovery (internal energy release), and the sliding seat 120 is driven downwards because the end 1601 of the linear spring 160 is fixed in the fixed seat 110 and the other end 1602 thereof is propped against the accepting notch 1243 of the sliding seat 120. When the sliding seat 120 is driven downwards, the sliding seat 120 is moved along vertical direction through the guidance of the guide rails and guide grooves. In addition, the deceleration of mechanism formed by the rack 1131 and the reduction gear 1242, the sliding seat 120 does not drop suddenly, and at the moment that the stopper 1245 of the sliding seat 120 and the stopper 1133 of the fixing touch and engage with each other, the sliding seat 120 is stopped at that time point and drops no more so that the sliding seat 120 and fixed seat 110 are kept connected and not separated. Meanwhile, the holding element 140 is moved leftward back to the original position owing to the rebounding force of the spring 1404. The engaging hook 1401 at the left side thereof can still be returned to the original position to prop against the face at the left side the fixed seat. At this time, as FIG. 5*b* shows, the interface panel structure 10 is at a condition that the interface panel 130 is opened and the interface outlets are exposed out of the frame body of the electric machine and a user can detach, change or maintain the outlets or insert or pull out cables from the front face thereof.

If the interface panel structure wants to be hidden, a user only needs to use a hand to push the bottom of the sliding seat 120 upwards to move it to a fixed position. In the meantime, the engaging hook 1401 of the holding element 140 is pushed to move rightwards by the inclined face 1711 of the actuating rod 171 owing to inclined plane movement. And, when the sliding seat 120 is pushed to the fixed position, the engaging hooks 1401 and 1402 are still pressed to engage with the engaged holes 125 by the elastic force of the spring 1404 to fix the sliding seat 120 in the fixed seat 110 so that the entirety of the interface panel structure 10 is hidden behind the front frame of the electric machine. Besides, the linear spring 160 is still formed extended-out at last because the end 1601 thereof is pulled apart by the accepting notch 1243.

Because the hidden and movable interface panel structure is provided by means of the installments of the sliding seat and the fixed seat, the panel is allowed to be exposed for a user to plug in or pull out cables or hidden in the frame body only by easily pushing the actuator 170 so that the outlook of the front frame of the electric machine can be kept compact and integrated. Besides, when the interface outlets need to be changed to meet requirements, the only thing needed to be done is to unscrew the screws to unload the interface panel at the front side of the sliding seat and then to replace it with a proper new interface panel or separate the stopper 1245 of the sliding seat from the stopper 1311 of the fixed seat to change the whole sliding seat. Therefore, comparing to the conventional structure in which an opening or more are needed, the alteration and maintenance are simpler, and the opening structure of the front frame needs not to be changed when the interface panel is changed.

Furthermore, the interface panel structure according to the present invention can be formed as a module, only screws are needed to fix and combine it with an electric machine so that the usage is flexible and the application range is broad.

From the statements mentioned above, the advantages of the present invention are the following:

(1) The hidden structure according to the present invention allows no limitation on opening a hole in the mold of the front frame, the hole can be changed depending on requirement, whether interface outlets or I/O ports are needed to be installed depends on a situation.

(2) The movable pluggable structure of the sliding seat according to the present invention can allow the changing and the maintenance more convenient.

(3) I/O ports are a hidden type, the front outlook of the electric machine can be kept compact and complete; they are exposed only in use.

What is claimed is:

1. An interface panel structure, comprising:
   a fixed seat, fixed in a frame body of an electric machine, and having a holding element and at least one vertical sliding rail;
   a sliding seat, installed in said fixed seat, a plurality of engaged holes operated in coordination with said holding element and a plurality of sliding groove matched up with said sliding rails for guiding said sliding seat to move vertically relative to said fixed seat being disposed therein;
   an actuator, being able to be driven to slide vertically and passed through said sliding seat to control said holding element to be separated from or engaged with said engaged holes; and
   an interface panel, fixed at the front face of said sliding seat, and a plurality of outlets being disposed therein.

2. The structure according to claim 1, a linear spring being further installed, wherein one end of said linear spring is fixed in said fixed seat, and another end thereof is fixed in said sliding seat for applying a downward force on said sliding seat.

3. The structure according to claim 1, wherein said holding element is slid transversally relative to said fixed seat and installed in the upper side of said fixed seat, an inclined face is disposed at one end of said holding element and another end thereof is engaged with a spring for the reposition of said holding element.

4. The structure of claim 1, wherein a rack is disposed in said fixed seat and a reduction gear engaged with said rack is disposed in said sliding seat.

5. The structure of claim 1, wherein stoppers used to engage each other are respectively disposed at the lower end of said fixed seat and the upper end of said sliding seat for fixing and positioning said sliding seat when said sliding seat is extended downwards out of said electric machine.

6. The structure according to claim 3, wherein an inclined face matched up with said inclined face on said holding element is disposed on the top end of said actuator, said holding element is touched off by said actuator to move transversally to release or lock said sliding seat.

* * * * *